United States Patent
Ward-Santos et al.

(10) Patent No.: US 11,691,531 B2
(45) Date of Patent: Jul. 4, 2023

(54) ADAPTATION OF CHARGE CURRENT LIMITS FOR A RECHARGEABLE ENERGY STORAGE SYSTEM

(71) Applicant: GM GLOBAL TECHNOLOGY OPERATIONS LLC, Detroit, MI (US)

(72) Inventors: Orlando Ward-Santos, Berkley, MI (US); Brian J. Koch, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 17/083,765

(22) Filed: Oct. 29, 2020

(65) Prior Publication Data

US 2022/0134900 A1      May 5, 2022

(51) Int. Cl.
| | |
|---|---|
| *H02J 7/00* | (2006.01) |
| *H02J 7/14* | (2006.01) |
| *B60L 53/62* | (2019.01) |
| *B60L 58/13* | (2019.01) |
| *B60L 53/16* | (2019.01) |

(52) U.S. Cl.
CPC ............. *B60L 53/62* (2019.02); *B60L 53/16* (2019.02); *B60L 58/13* (2019.02); *H02J 7/0045* (2013.01); *H02J 7/0048* (2020.01); *H02J 7/00714* (2020.01); *B60L 2240/549* (2013.01); *B60L 2260/42* (2013.01); *H02J 2310/48* (2020.01)

(58) Field of Classification Search
CPC .......... B60L 53/62; B60L 53/16; B60L 58/13; B60L 2240/549; B60L 2260/42; H02J 7/0048; H02J 7/00714; H02J 7/0045; H02J 23/10; H02J 23/48

USPC ......................... 320/134, 104, 109
See application file for complete search history.

(56) References Cited

U.S. PATENT DOCUMENTS

| | | | | |
|---|---|---|---|---|
| 2011/0309793 A1* | 12/2011 | Mitsutani | ............... | B60L 58/12 320/109 |
| 2012/0078553 A1* | 3/2012 | Kuroda | ................... | G01C 21/32 702/63 |
| 2012/0200266 A1* | 8/2012 | Berkowitz | ........... | G01R 31/392 320/139 |
| 2012/0299552 A1* | 11/2012 | Machida | ................... | H02J 7/04 320/138 |
| 2013/0317690 A1* | 11/2013 | Fujita | .................. | H01M 10/443 701/29.2 |

(Continued)

*Primary Examiner* — Alexis B Pacheco
(74) *Attorney, Agent, or Firm* — Quinn IP Law

(57) ABSTRACT

A battery system includes a rechargeable energy storage system and a battery controller. The rechargeable energy storage system has a rapid charging mode and a discharging mode. The battery controller is electrically coupled to the rechargeable energy storage system and is configured to store multiple charging tables that contain multiple charge current limit entries, where each charging table corresponds to a unique one of multiple initial state-of-charge values, determine a starting state-of-charge value of the rechargeable energy storage system in response to entering the rapid charging mode, select up to two charging tables in response to the starting state-of-charge value of the rechargeable energy storage system being adjacent to up to two of the initial state-of-charge values, and control a charging current provided to the rechargeable energy storage system based on the charge current limit entries in the up to two charging tables as selected.

20 Claims, 4 Drawing Sheets

(56) References Cited

U.S. PATENT DOCUMENTS

| | | | |
|---|---|---|---|
| 2015/0180255 A1* | 6/2015 | Kim | B60L 50/51 |
| | | | 320/162 |
| 2016/0164316 A1* | 6/2016 | Shizuno | B60L 58/12 |
| | | | 320/157 |
| 2016/0272075 A1* | 9/2016 | Biagini | B60L 53/22 |
| 2017/0158079 A1* | 6/2017 | Lim | H02J 7/0048 |
| 2020/0158039 A1* | 5/2020 | Aoki | B60L 3/0046 |
| 2020/0254896 A1* | 8/2020 | Lee | B60L 53/62 |
| 2020/0331355 A1* | 10/2020 | Choi | B60L 53/22 |
| 2021/0086650 A1* | 3/2021 | Wang | B60L 53/66 |

\* cited by examiner

ADAPTATION OF CHARGE CURRENT LIMITS FOR A RECHARGEABLE ENERGY STORAGE SYSTEM

INTRODUCTION

The present disclosure relates to a system and a method for adaptation of charge current limits for a rechargeable energy storage system.

A charge current limit of a rechargeable battery pack is sensitive to a starting state-of-charge. Due to the increased polarization accumulated by cells within the battery pack, current limits appropriate to avoid lithium plating are more restrictive when a battery pack starts charging from a lower state-of-charge. Therefore, a common approach is to presume that the battery pack always has a 0% state-of-charge to account for a worst-case charging profile.

What is desired is a technique for adaptation of charge current limits for a rechargeable energy storage system.

SUMMARY

A battery system is disclosed herein. The battery system includes a rechargeable energy storage system and a battery controller. The rechargeable energy storage system has a rapid charging mode and a discharging mode. The battery controller is electrically coupled to the rechargeable energy storage system. The battery controller is configured to store a plurality of charging tables that contain a plurality of charge current limit entries, where each of the plurality of charging tables corresponds to a unique one of a plurality of initial state-of-charge values, determine a starting state-of-charge value of the rechargeable energy storage system in response to entering the rapid charging mode, select up to two charging tables from the plurality of charging tables in response to the starting state-of-charge value of the rechargeable energy storage system being adjacent to up to two of the plurality of initial state-of-charge values, and control a charging current provided to the rechargeable energy storage system based on the plurality of charge current limit entries in the up to two charging tables as selected.

In one or more embodiments of the battery system, a single one of the plurality of charging tables is selected in response to the starting state-of-charge value of the rechargeable energy storage system matching a single value of the plurality of initial state-of-charge values.

In one or more embodiments of the battery system, the battery controller is further configured to generate a plurality of intermediate charge current limit entries by interpolating between the plurality of charge current limit entries in the up to two charging tables in response to the starting state-of-charge value of the rechargeable energy storage system falling between two of the plurality of initial state-of-charge values. The control of the charging current provided to the rechargeable energy storage system is based on the plurality of intermediate charge current limit entries.

In one or more embodiments of the battery system, a first initial state-of-charge value among the plurality of initial state-of-charge values is less than a second initial state-of-charge value among the plurality of initial state-of-charge values, and the plurality of charge current limit entries that correspond to the first initial state-of-charge value cause the rechargeable energy storage system to be charged at a lower rate than the plurality of charge current limit entries that correspond to the second initial state-of-charge value.

In one or more embodiments of the battery system, the battery controller is further configured to adjust the starting state-of-charge value by a margin value prior to the selection of the up to two charging tables. The margin value accounts for inaccuracies in one or more measurements used to determine the starting state-of-charge value, a calculation used to determine the starting state-of-charge value, and the rechargeable energy storage system being in a non-rested condition when the starting state-of-charge value is determined.

In one or more embodiments of the battery system, the battery charger is further configured to receive the plurality of charging tables from a test station configured to calibrate the plurality of charge current limit entries to model recharging of the rechargeable energy storage system.

In one or more embodiments of the battery system, the plurality of charge current limit entries in the plurality of charging tables form a three-dimensional surface of entries with a cell potential as a first dimension, a charge rate as a second dimension, and the plurality of initial state-of-charge values as a third dimension.

In one or more embodiments of the battery system, the rechargeable energy storage system and the battery controller are mountable in a vehicle.

In one or more embodiments of the battery system, the rapid charging mode is a direct-current fast charging mode in which the vehicle receives a direct-current electrical power from a charging station.

A method for adaptation of charge current limits for a rechargeable energy storage system is provided herein. The method includes storing in a battery controller a plurality of charging tables that contain a plurality of charge current limit entries of a rechargeable energy storage system. Each of the plurality of charging tables corresponds to a unique one of a plurality of initial state-of-charge values, and the rechargeable energy storage system has a rapid charging mode and a discharging mode. The method includes determining a starting state-of-charge value of the rechargeable energy storage system in response to entering the rapid charging mode selecting up to two charging tables from the plurality of charging tables in response to the starting state-of-charge value of the rechargeable energy storage system being adjacent to up to two of the plurality of initial state-of-charge values, and controlling a charging current provided to the rechargeable energy storage system based on the plurality of charge current limit entries in the up to two charging tables as selected.

In one or more embodiments of the method, a single one of the plurality of charging tables is selected in response to the starting state-of-charge value of the rechargeable energy storage system matching a single value of the plurality of initial state-of-charge values.

In one or more embodiments, the method further includes generating a plurality of intermediate charge current limit entries by interpolating between the plurality of charge current limit entries in the up to two charging tables in response to the starting state-of-charge value of the rechargeable energy storage system falling between two of the plurality of initial state-of-charge values. The controlling of the charging current provided to the rechargeable energy storage system is based on the plurality of intermediate charge current limit entries.

In one or more embodiments of the method, a first initial state-of-charge value among the plurality of initial state-of-charge values is less than a second initial state-of-charge value among the plurality of initial state-of-charge values, and the plurality of charge current limit entries that correspond to the first initial state-of-charge value cause the rechargeable energy storage system to be charged at a slower rate than the plurality of charge current limit entries that correspond to the second initial state-of-charge value.

In one or more embodiments, the method further includes adjusting the starting state-of-charge value by a margin value prior to the selecting of the up to two charging tables. The margin value accounts for inaccuracies in one or more of measurements used to determine the starting state-of-charge value, a calculation used to determine the starting state-of-charge value, and the rechargeable energy storage system being in a non-rested condition when the starting state-of-charge value is determined.

In one or more embodiments, the method further includes calibrating the plurality of charge current limit entries to model recharging of the rechargeable energy storage system, and transferring the plurality of charging tables to the battery controller after the calibration.

In one or more embodiments of the method, a slower charging table of the up to two charging tables is selected in response to the starting state-of-charge value of the rechargeable energy storage system falling between two of the plurality of initial state-of-charge values.

A vehicle is provided herein. The vehicle includes a rechargeable energy storage system, a direct-current fast charging connector, and a battery controller. The rechargeable energy storage system has a rapid charging mode and a discharging mode. The battery controller is electrically coupled to the rechargeable energy storage system and the direct-current fast charging connector. The battery controller is configured to store a plurality of charging tables that contain a plurality of charge current limit entries, where each of the plurality of charging tables corresponds to a unique one of a plurality of initial state-of-charge values, determine a starting state-of-charge value of the rechargeable energy storage system in response to entering the rapid charging mode, select up to two charging tables from the plurality of charging tables in response to the starting state-of-charge value of the rechargeable energy storage system being adjacent to up to two of the plurality of initial state-of-charge values, and control a charging current from the direct-current fast charging connector to the rechargeable energy storage system based on the plurality of charge current limit entries in the up to two charging tables as selected.

In one or more embodiments of the vehicle, the battery controller is further configured to generate a plurality of intermediate charge current limit entries by interpolating between the plurality of charge current limit entries in the up to two charging tables in response to the starting state-of-charge value of the rechargeable energy storage system as measured falling between two of the plurality of initial state-of-charge values. The control of the charging current provided to the rechargeable energy storage system is based on the plurality of intermediate charge current limit entries.

In one or more embodiments, the vehicle further includes a charger configured to adjust the charging current to the rechargeable energy storage system in response to a control signal from the battery controller.

In one or more embodiments, the vehicle further includes an alternator or a generator. The rechargeable energy storage system has a normal charging mode. The charger is further configured to route the charging current from the direct-current fast charging connector while in the rapid charging mode, and from the alternator or the generator while in the normal charging mode.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and technique to improve direct-current fast-charge (DCFC) charge times for a rechargeable energy storage system (e.g., a battery pack) by modulating between high-voltage battery charge current limit tables used to control a fast charging current. The different charge current limits may take advantage of using less polarized direct-current fast-charge current limits for higher starting state-of-charge values of the rechargeable energy storage system. The system and technique generally allow for robust limits for lower starting state-of-charge values, while also allowing for more capable limits for customers charging at higher starting state-of-charge values. A battery controller may optimize the direct-current fast-charge charge times by interpolating between charge current limit tables that are selected based on starting state-of-charge values.

In one or more embodiments, a test station in a calibration system may characterize a lithium plating capability of the rechargeable energy storage system at various starting state-of-charge values through cell and pack-level testing. The resulting charge current limit entries are grouped into charging tables, each associated with a unique (or distinguishable) initial state-of-charge value and each representing a rapid charging curve. The charging tables are stored in a vehicle that carries the rechargeable energy storage system. The technique accounts for sensing inaccuracy and customer variability to apply offsets to the calibration tables.

The battery controller uses a state-of-charge (state-of-health and/or voltage) of the rechargeable energy storage system as an input into a process that may select one of the stored calibration tables and/or interpolate between two of the stored calibration tables, and subsequently selects optimal limits to control the rapid charging.

Figure 1:
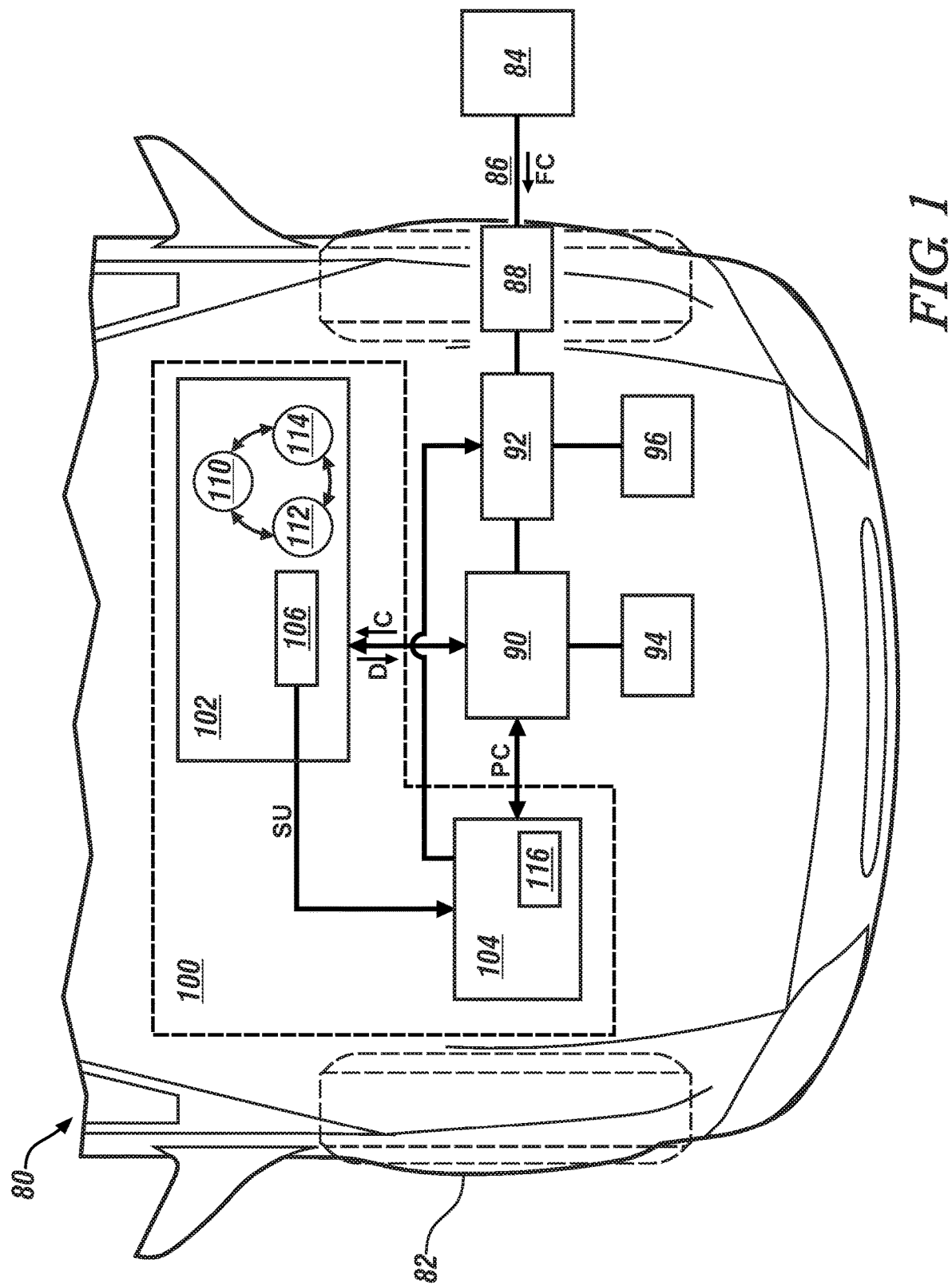
FIG. 1 is a schematic plan diagram illustrating a context of a system.

Referring to FIG. 1, a schematic plan diagram illustrating a context of a system 80 is shown. The system 80 may implement a vehicle 82 couplable to a charging station 84 through a charging cable 86. The vehicle 82 includes a direct-current fast charging connector 88, a power inverter module 90, a charger 92, one or more electric motors (one shown) 94, a generator 96, and a battery system 100. The battery system 100 includes a rechargeable energy storage system 102 and a battery controller 104. The rechargeable energy storage system 102 includes a sensor unit 106. The rechargeable energy storage system 102 may have a discharging mode 110, a normal charging mode 112, and a rapid charging mode 114. The battery controller 104 stores multiple charging tables 116.

A charge control signal (e.g., CC) is generated by the battery controller 104 and transferred to the charger 92. The charge control signal CC conveys data used by the battery controller 104 to control an output voltage and/or output current of the charger 92. A power control signal (e.g., PC) is exchanged between the battery controller 104 and the power inverter module 90. The power control signal PC transfers data and information used to control the electric motor 94 and to charge and discharge the rechargeable energy storage system 102. A sensor signal (e.g., SU) is generated by the sensor unit 106 and transferred to the battery controller 104. The sensor signal SU may convey data obtained by the sensor unit 106 from battery cells within the rechargeable energy storage system 102.

The vehicle 82 may include, but is not limited to, mobile objects such as automobiles, trucks, motorcycles, hybrid vehicles, electric vehicles, hybrid electric vehicles, boats, trains and/or aircraft. In some embodiments, the vehicle 82 may include stationary objects such as billboards, kiosks, power back-up systems (e.g., uninterruptible power supplies) and/or marquees. Other types of vehicles 82 may be implemented to meet the design criteria of a particular application. Where the vehicle 82 is mobile, the vehicle 82 generally uses the electric motor 94 and/or an internal-combustion engine to drive wheels that propel the vehicle 82 about the ground and/or roads.

The charging station 84 is implemented as a direct-current fast-charge (DCFC) charging station. The charging station 84 is operational to provide direct-current electrical power that rapidly charges the vehicle 82 (e.g., the rechargeable energy storage system 102) through the charging cable 86. The rapid charging typically is accomplished in less than 25 minutes. In various embodiments, the charging station 84 may deliver high-voltage electrical power over a range of approximately 50,000 watts (W) to 150,000 W, at approximately 300 volts direct current (Vdc) to 500 Vdc, with a charging current of at least 100 amperes (A) and up to 500 A.

The connector 88 is implemented as a direct-current fast-charge connector. The connector 88 is operational to receive the high-voltage electrical power from the charging station 84 via the charging cable 86. In some embodiments, the connector 88 may include sockets for alternating-current (AC) electrical power. Various designs of the connector 88 may include sockets for low-voltage electrical power (e.g., 12 Vdc) to charge one or more regular batteries for powering electrical accessories within the vehicle 82 and starting an internal combustion engine, if present.

The power inverter module 90 is implemented as a DC-to-AC converter/switching circuit. The power inverter module 90 is operational to deliver power to the electric motor 94 and the battery system 100 as controlled by the data received from the battery controller 104 in the power control signal PC. While the rechargeable energy storage system 102 is in the discharge mode 110, the power inverter module 90 is operational to convert DC high-voltage electrical power received from the rechargeable energy storage system 102 into AC electrical power that energizes the electric motor 94. While the rechargeable energy storage system 102 is in the normal charging mode 112 or the rapid charging mode 114, the power inverter module 90 may route the high-voltage electrical power from the charger 92 to the rechargeable energy storage system 102.

The power inverter module 90 may also couple the high-voltage system to the low voltage system of the vehicle 82, and may perform a number of different functions in that capacity. In various embodiments, power inverter module 90 includes an accessory power module (APM) circuitry that is electrically coupled to both the high-voltage bus and the low-voltage bus in the vehicle 82 so that electrical energy can be exchanged therebetween. The power inverter module 90 may include any combination of processing and memory resources, as well as transformers and/or other electrical components used for transmitting or exchanging electrical power between different components, devices, modules, etc. of the vehicle 82.

The charger 92 is implemented as a controllable battery charger. The charger 92 is operational to route the high-voltage electrical power from the connector 88 and the generator 96 to the power inverter module 90 as controlled through the charge control signal CC. A voltage and/or a current of the high-voltage electrical power delivered by the charger 92 is variable based on the data received from the battery controller 104 in the charge control signal CC. The charger 92 directs the high-voltage electrical power received from the charging station 84 to provide for rapid recharging of the battery system 100. The charger 92 also directs the high-voltage electrical power received from the generator 96 to provide for normal recharging of the battery system 100 where the vehicle 82 is propelled by an internal combustion engine.

The electric motor 94 is implemented as a multiple-phase (e.g., three-phase) motor. The electric motor 94 is operational to propel the vehicle 82 using electric power stored in the battery system 100. The electric motor 94 may include any type of suitable electric motor known in the art. The electrical power consumed by the electric motor 94 may be provided by the battery system 100 and/or the generator 96 under the control of the battery controller 104. While the electric motor 94 is depicted as a discrete device, other embodiments may be implemented that incorporate or otherwise combine the electric motor 94 with a transmission, the generator 96, or the like.

The generator 96 is implemented as a generator, an alternator, or an inverter. Where implemented as a high-voltage power source, the generator uses mechanical motion provided by the internal combustion engine to generate the high-voltage electrical power for charging the battery system 100. In some embodiments, the generator 96 may also be operational to generate the low-voltage electrical power (e.g., 12 Vdc) for powering the electrical accessories within the vehicle 82. Any number of suitable generators 96 known in the art may be used. Where implemented as an inverter (e.g., in an all-electric vehicle), the generator 96 is operational to convert the high-voltage electrical power available in the battery system 100 into the low-voltage electrical power.

The battery system 100 may be implemented as a high-voltage rechargeable battery system. The battery system 100 is operational to store energy used by the motor 94. In a charging mode, the battery system 100 may receive electrical current from the generator 96 or from the charging station 84. In a discharging mode, the battery system 100 may provide electrical current to the power inverter module 90 to operate the motor 94.

The rechargeable energy storage system 102 is implemented as a high-voltage battery pack. The rechargeable energy storage system 102 is configured to store electrical energy. The rechargeable energy storage system is generally operational to receive electrical power from the power inverter module 90 and provide electrical power to the power inverter module 90. The rechargeable energy storage system may include multiple battery modules electrically connected in series and/or in parallel. In various embodiments, the rechargeable energy storage system may provide approximately 200 to 1,000 volts DC (direct current) electrical potential. Other battery voltages may be implemented to meet the design criteria of a particular application.

In various embodiments, the rechargeable energy storage system 102 may be of any suitable battery type known in the art. For instance, examples of suitable battery types include all types of lithium-ion (e.g., lithium iron phosphate, lithium nickel manganese cobalt, lithium iron sulfide and lithium polymer, etc.), lead-acid, advanced lead-acid, nickel metal hydride (NiMH), nickel cadmium (NiCd), zinc bromide, sodium nickel chloride (NaNiCl), zinc air, vanadium redox, and others.

The sensor unit 106 is operational to sense, monitor, evaluate, control, manage, etc. certain charging and/or discharging functions related to rechargeable energy storage system 102. In some embodiments, the sensor unit 106 is a battery pack control module (BPCM) integrated within the rechargeable energy storage system 102 and includes one or more battery sensor(s) coupled to the rechargeable energy storage system 102, as well as processing and memory resources. The battery sensors may include temperature, state-of-charge (SOC), voltage and/or current sensors, as well as any other suitable battery sensor, and provide readings that can be processed by the sensor unit itself and/or forwarded to other devices, components, modules, etc. For example, various battery conditions can be gathered, processed, and saved by sensor unit 106 and then transmitted to battery controller 104 in the sensor signal SU. Although the rechargeable energy storage system 102 and sensor unit 106 are schematically shown here as integrated into a single component, it should be appreciated that other embodiments can involve mounting the sensor unit 106 external to the rechargeable energy storage system 102 and coupling the battery pack-mounted sensors to the sensor unit 106 via a communication medium.

The rechargeable energy storage system 102 generally operates in one of the three modes: the discharging mode 110, the normal charging mode 112, and the rapid charging mode 114. In the discharging mode 110, the rechargeable energy storage system 102 presents a discharging current (D) to the power inverter module 90 to operate the motor 94. In the normal charging mode 112, the rechargeable energy storage system 102 receives a charging current (C) produced by the generator 96. In the rapid charging mode 114, the rechargeable energy storage system 102 receives the charging current C as a direct-current fast-charge (FC) current produced by the charging station 84.

The battery controller 104 includes any variety of electronic processing devices, memory devices, input/output (I/O) devices, and/or other known components, and may perform various control and/or communication related functions. The battery controller 104 is operational to store the charging tables 116 that contain multiple charge current limit entries, determine a starting state-of-charge value of the rechargeable energy storage system 102 upon entering the rapid charging mode 114, select up to two of the charging tables in response to the starting state-of-charge value of the rechargeable energy storage system 102 being adjacent (or similar) to up to two of initial state-of-charge values of the charging tables, and control a charging current provided to the rechargeable energy storage system 102 based on the charge current limit entries in the up to two charging tables as selected. Each charging table corresponds to a unique one of the initial state-of-charge values.

The battery controller 104 may also be operational to store various sensor readings (e.g., battery temperature, SOC, voltage, current sensor readings), data structures, software, and the like. The battery controller 104 may store pertinent characteristics and background information including, but not limited to, battery state-of-charge limits, battery voltage limits, battery current limits, battery temperature limits, and temperature profiles. The battery controller 104 may be electronically coupled to other vehicle devices and modules via a suitable vehicle communications connection and may interact with the other devices as appropriate.

Depending on the particular embodiment, battery controller 104 may be a stand-alone vehicle electronic module (e.g., a hybrid control module (HCM), a vehicle control integrated module (VCIM), a traction power inverter module (TPIM), a battery power inverter module (BPIM), part of an instrument cluster itself, an engine control module (ECM), etc.). The battery controller 104 may be incorporated or included within another vehicle electronic module (e.g., a power train control module or a hybrid control module), or it may be part of a larger network or system (e.g., a battery management system (BMS), a vehicle energy management system, a hybrid control system, etc.), to name a few possibilities. The battery controller 104 may also be part of or interact with a system that determines a desired hybrid operating mode (e.g., accelerating, braking, idling, stopping, etc.) and may implement electrical power management actions accordingly.

The charging tables 116 are implemented as charge limiting tables each containing multiple charge current limit entries. Each charging table 116 corresponds to a unique initial state-of-charge value. The charge current limit entries from one or two of the charging tables 116 are used at a time by the battery controller 104 to govern the charging current C presented to the rechargeable energy storage system 102 at least while in the rapid charging mode 114.

Figure 2:
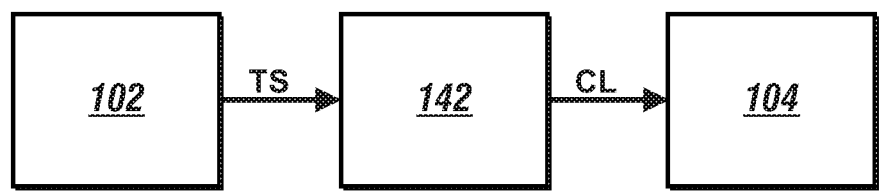
FIG. 2 is a schematic diagram of a calibration system in accordance with one or more exemplary embodiments.

Referring to FIG. 2, a schematic diagram of an example implementation of a calibration system 140 is shown in accordance with one or more exemplary embodiments. The calibration system 140 includes a test station 142, a rechargeable energy storage system 102 and a corresponding battery controller 104.

A test signal (TS) is exchanged between the rechargeable energy storage system 102 and the test station 142. The test signal TS contains test commands and test results used to test the rapid charging of the rechargeable energy storage system 102. A calibration signal (CL) is generated by the test station 142 and transferred to the battery controller 104. The calibration signal CL carries the charging tables 116 that model recharging of the rechargeable energy storage system 102 or rapid recharging.

The test station 142 is operational to establish a variety of starting state-of-charge conditions through the test signal TS and subsequently measure charging rate characteristics of the rechargeable energy storage system 102 at the starting state-of-charge values. The test station 142 uses the measurements to calculate the charge current limit entries for each charging table 116 that corresponds to one of the starting state-of-charge values. The charging tables 116 are then transferred to the battery controller 104 via the calibration signal CL. Therefore, the charging tables 116 stored in the battery controller 104 are customized to a particular rechargeable energy storage system 102.

Figure 3:
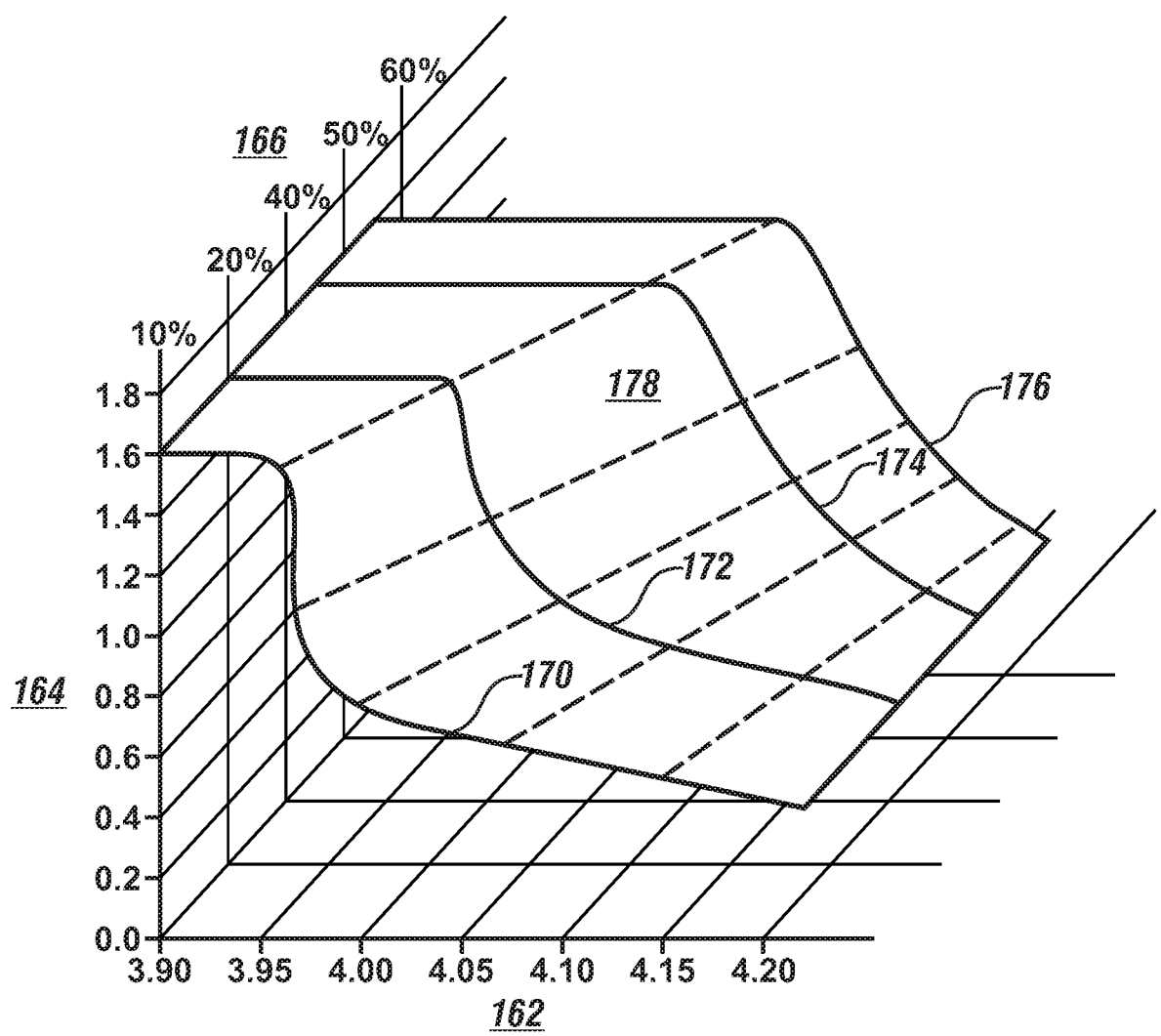
FIG. 3 is a graph of a set of charge current limit entries in accordance with one or more exemplary embodiments.

Referring to FIG. 3, a graph 160 of an example set of charge current limit entries are shown in accordance with one or more exemplary embodiments. A first axis 162 of the graph 160 represents a cell potential in units of volts. A second axis 164 of the graph 160 represents a C rate (current divided by nominal capacity of the battery). A third axis 166 represents a starting state-of-charge value in units of percentage. Conditions for the example are 25 degrees Celsius, 1.67 C rate constant current constant anode potential=0V vs. Li/Li$^+$. The three axes 162, 164 and 166 provide a cell potential as a first dimension, a charge rate as a second dimension, and the initial state-of-charge values as the third dimension.

A 0% starting state-of-charge condition (curve 170) generally provides for a series of calibration limits that protect for all customer usages. A 20% starting state-of-charge condition (curve 172) provides for a series of calibration limits where the rechargeable energy storage system 102 begins the rapid charging with approximately a 20% state-of-charge. A 40% starting state-of-charge condition (curve 174) provides for a series of calibration limits where the rechargeable energy storage system 102 begins the rapid charging with approximately a 40% state-of-charge value. A 50% starting state-of-charge condition (curve 176) provides for a series of calibration limits where the rechargeable energy storage system 102 begins the rapid charging with approximately a 50% state-of-charge value. The curves 172 to 176 show that the rechargeable energy storage system 102 can be charged at higher rates to higher cell potentials where the starting state-of-charge value is higher than 0%. The sets of charge current limit entries for each curve 170-176 are gathered into the charging tables 116 by the test station 142 (FIG. 2) and loaded into the battery controller 104.

For starting state-of-charge values that do not fall directly on the curves 170-176, the battery controller 104 may interpolate between the nearest two charging tables 116 to generate an intermediate set of charge current limit entries. The intermediate charge current limit entries are subsequently used by the battery controller 104 to control the rapid charging of the rechargeable energy storage system 102. In various embodiments, the interpolation may be proportional to a distance of the measured starting state-of-charge value from the nearest initial state-of-charge values. For example, a starting state-of-charge value of 30% may fall midway between a first initial state-of-charge value of 20% and a second initial state-of-charge value of 40% for two of the charging tables 116. Therefore, the battery controller 104 may weight each intermediate current limit entry as half of the corresponding entry in the 20% initial state-of-charge charging table 116 and half of the corresponding entry in the 40% initial state-of-charge charging table 116. For a starting state-of-charge value of 42%, the battery controller 104 may weight each intermediate charge current limit entry as ⅘$^{th}$ of the corresponding entry in the 40% initial state-of-charge charging table 116 and ⅕$^{th}$ of the corresponding entry in the 50% initial state-of-charge charging table 116. Other interpolation techniques may be implemented to meet the design criteria of a particular application. In various embodiments, a next-lowest charging table may be selected to provide a conservative approach. For example, if the starting state-of-charge value is 30%, the table corresponding to a 20% state-of-charge value may be utilized.

Using the charging tables 116 calibrated for specific starting state-of-charge values for the rechargeable energy storage system 102, and interpolating the charge current limit entries between the charging tables 116, the battery controller 104 has a three-dimensional surface of entries 178 that are available to optimize the DCFC charge times based on the starting state-of-charge value of the rechargeable energy storage system 102. The three-dimensional surface of entries 178 allows the battery system 100 to be rapidly charged closer to a true limit of the rechargeable energy storage system 102.

Figure 4:
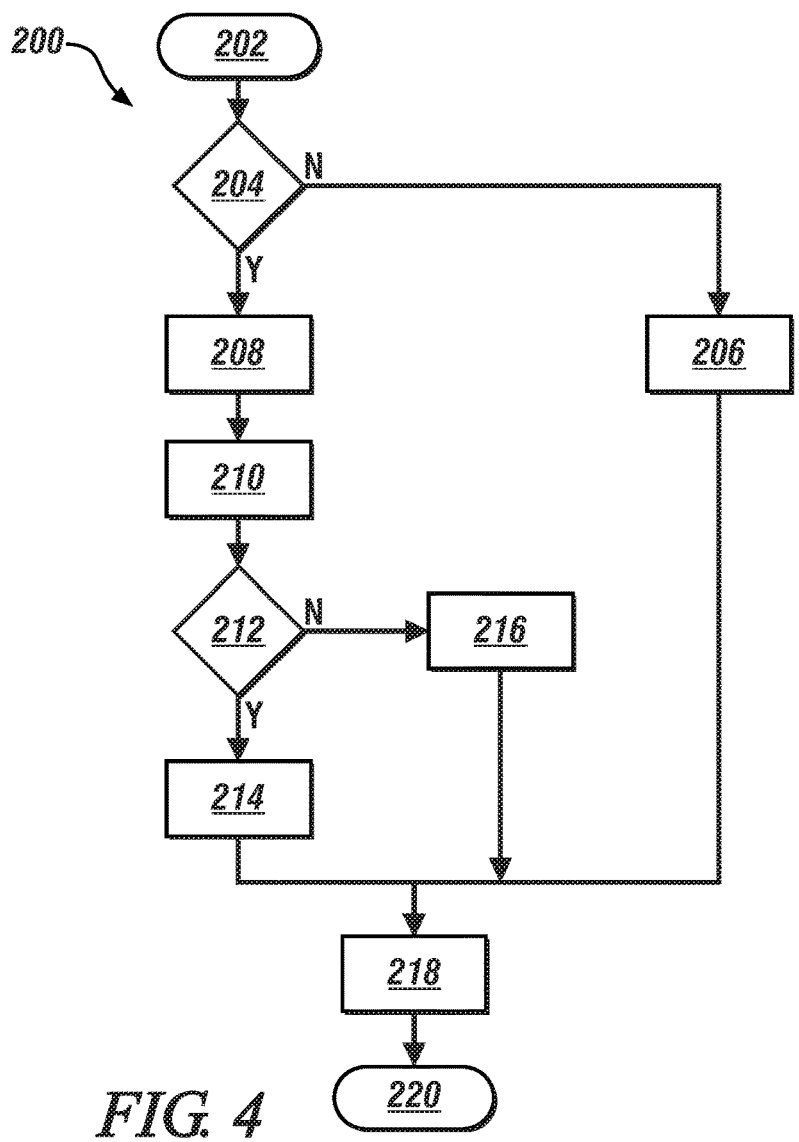
FIG. 4 is a flow diagram of a method for adaptation of charge current limits for a rechargeable energy storage system in accordance with one or more exemplary embodiments.

Referring to FIG. 4, a flow diagram of an example method 200 for adaptation of charge current limits for the rechargeable energy storage system 102 is shown in accordance with one or more exemplary embodiments. The method (or process) 200 may be implemented by the battery system 100. The method 200 includes a step 202, a step 204, a step 206, a step 208, a step 210, a step 212, a step 214, a step 216, a step 218, and a step 220. The sequence of steps is shown as a representative example. Other step orders may be implemented to meet the criteria of a particular application.

The method generally starts at the step 202 with the rechargeable energy storage system 102 entering the rapid charging mode 114. In the step 204, the sensor unit 106 measures and compares a current of the rechargeable energy storage system 102 to a threshold value to determine if the rechargeable energy storage system 102 is close to a rested condition or not. The controller 104 generally knows how long the current has been below the threshold value, and this time should meet a minimum threshold as well. The starting state-of-charge value may also be a last stored value calculated by a process in the controller 104. If the rechargeable energy storage system 102 is in a non-rested condition when the staring state-of-charge value is determined, the battery controller 104 may default in the step 206 to use of the 0% initial state-of-charge charging table 116. If the rechargeable energy storage system 102 is close to or at rest (e.g., approximately no current is flowing in or out), the battery controller 104 calculates a starting state-of-charge value for the rechargeable energy storage system 102 in the step 208. The starting state-of-charge value is typically based on a measured voltage of the cells or of the entire battery pack.

In the step 210, the battery controller 104 subtracts a calibratable margin value from the starting state-of-charge value. Reduction of the starting state-of-charge value generally accounts for issues such as sensor inaccuracies in the sensor unit 106, calculation inaccuracies in determining the starting state-of-charge value from the measured voltages, and/or the rechargeable energy storage system 102 not being fully at rest. Other issues may be considered to meet the design criteria of a particular application.

In the step 212, the battery controller 104 compares the starting state-of-charge value, as adjusted in the step 208, with the initial state-of-charge values that correspond to the charging tables 116. If the starting state-of-charge value matches or is close to matching (e.g., ±1%) a particular one of the initial state-of-charge values, the battery controller 104 selects the corresponding matching charging table 116 in the step 214. Otherwise, the battery controller 104 selects the two adjacent initial state-of-charge values and interpolates the charge current limit entries in the two corresponding charging tables 116 to create an intermediate set of charge current limit entries in the step 216. In some embodiments, the battery controller 104 may select a slower charging table 116 of the two adjacent charging tables 116 in the step 216 in place of interpolating between the two charging tables 116.

In the step 218, the battery controller 104 utilizes the charge current limit entries and the starting state-of-charge value to charge the rechargeable energy storage system 102 quickly. After the rapid charging has completed, the method 200 may end at the step 220.

Figure 5:
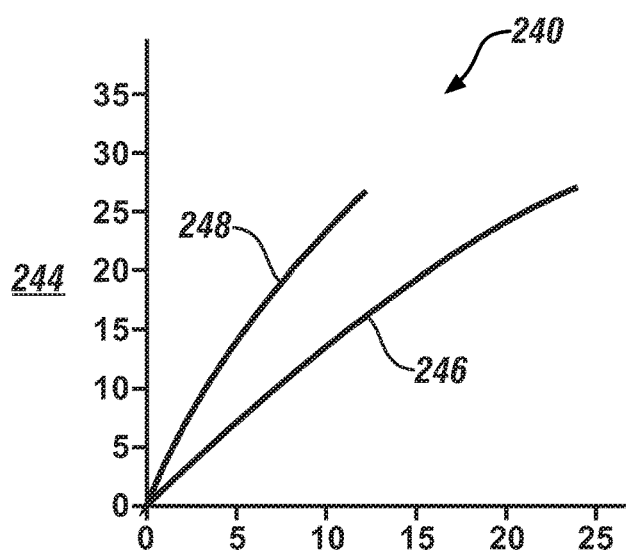
FIG. 5 is a graph of a returned state-of-charge in accordance with one or more exemplary embodiments.

Referring to FIG. 5, a graph 240 of an example returned state-of-charge is shown in accordance with one or more exemplary embodiments. A first axis 242 of the graph 240 represents time in units of minutes. A second axis 244 of the graph 240 represents a state-of-charge returned by the battery system 100 in units of percentage. Conditions for the example are 25 degrees Celsius, 1.67 C rate constant current/constant anode potential=0V vs. Li/Li$^+$.

A curve 246 illustrates an example state-of-charge return where the rechargeable energy storage system 102 was rapidly charged following the charge current limit entries in the 0% initial state-of-charge charging table 116. A curve 248 illustrates an example state-of-charge return where the rechargeable energy storage system 102 was rapidly charged at a maximum rate following the charge current limit entries in the 50% initial state-of-charge charging table 116. The curve 248 shows a greater than 40 percent improvement on the charge time using the 50% initial state-of-charge charging table 116, instead of the 0% initial state-of-charge charging table 116.

Figure 6:
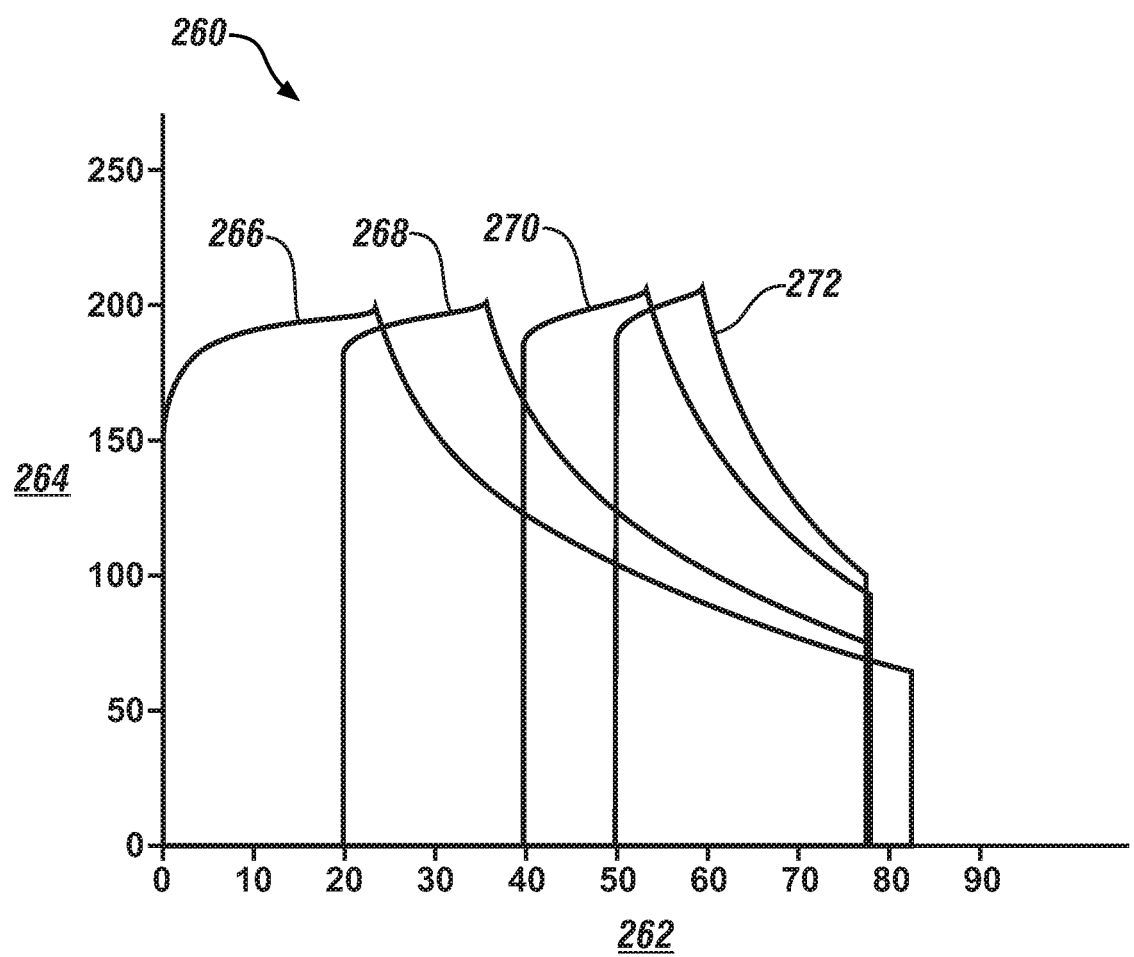
FIG. 6 is a graph of peak charge power curves in accordance with one or more exemplary embodiments.

Referring to FIG. 6, a graph 260 of example peak charge power curves is shown in accordance with one or more exemplary embodiments. A first axis 262 of the graph 260 represents the starting state-of-charge value of the rechargeable energy storage system 102 in units of percentage. A second axis 264 of the graph 260 represents a charge power of the rechargeable energy storage system 102 in units of kilowatts. Conditions for the example are 25 degrees Celsius, and a 500-ampere peak current and variable starting state-of-charge value.

A curve 266 illustrates the peak charging power based on the 0% initial state-of-charge charging table 116. A curve 268 illustrates the peak charging power based on the 20% initial state-of-charge charging table 116. A curve 270 illustrates the peak charging power based on the 40% initial state-of-charge charging table 116. A curve 272 illustrates the peak charging power based on the 50% initial state-of-charge charging table 116. As shown by the curves 266-272, as the starting state-of-charge value of the rechargeable energy storage system 102 increases, the peak charging power also increases. Furthermore, the curves 266-272 show that the power for a given state-of-charge is higher when starting from a higher initial state-of-charge.

Embodiments of the disclosure decrease direct-current fast-charge charging times by modulating between high-voltage battery charge current limit tables selected based on the starting state-of-charge value of the rechargeable energy storage system. The technique generally optimizes the direct-current fast-charge charging times by using a state of charge of the rechargeable energy storage system to select a charging table and/or interpolate between two nearest charging tables. The technique allows for robust limits for lower starting state-of-charge values, while also allowing for more capable limits for customers charging at higher starting state-of-charge values. Charging speeds are increased for customers who plug into a charging station with a higher starting state-of-charge value without increasing the piece price of the cells/battery pack.

While the best modes for carrying out the disclosure have been described in detail, those familiar with the art to which this disclosure relates will recognize various alternative designs and embodiments for practicing the disclosure within the scope of the appended claims.

What is claimed is:

1. A battery system comprising:
    a rechargeable energy storage system having a rapid charging mode and a discharging mode; and
    a battery controller electrically coupled to the rechargeable energy storage system and configured to:
        store a plurality of charging tables that contain a plurality of charge current limit entries of the rechargeable energy storage system, wherein each of the plurality of charging tables corresponds to a unique one of a plurality of initial state-of-charge values of the rechargeable energy storage system;
        determine a starting state-of-charge value of the rechargeable energy storage system in response to entering the rapid charging mode;
        select two charging tables from the plurality of charging tables in response to the starting state-of-charge value of the rechargeable energy storage system being adjacent to two of the plurality of initial state-of-charge values; and
        control a charging current provided to the rechargeable energy storage system based on the plurality of charge current limit entries in the two charging tables as selected.

2. The battery system according to claim 1, wherein a single one of the plurality of charging tables is selected in response to the starting state-of-charge value of the rechargeable energy storage system matching a single value of the plurality of initial state-of-charge values, and the battery controller is further configured to control the charging current provided to the rechargeable energy storage system based on the plurality of charge current limit entries in the single one of the plurality of charging tables as selected.

3. The battery system according to claim 1, wherein the battery controller is further configured to generate a plurality of intermediate charge current limit entries by interpolating between the plurality of charge current limit entries in the two charging tables in response to the starting state-of-charge value of the rechargeable energy storage system falling between two of the plurality of initial state-of-charge values, wherein the control of the charging current provided to the rechargeable energy storage system is based on the plurality of intermediate charge current limit entries.

4. The battery system according to claim 1, wherein a first initial state-of-charge value among the plurality of initial state-of-charge values is less than a second initial state-of-charge value among the plurality of initial state-of-charge values, and the plurality of charge current limit entries that correspond to the first initial state-of-charge value cause the rechargeable energy storage system to be charged at a lower rate than the plurality of charge current limit entries that correspond to the second initial state-of-charge value.

5. The battery system according to claim 1, wherein the battery controller is further configured to adjust the starting state-of-charge value by a margin value prior to the selection of the up to two charging tables, wherein the margin value accounts for inaccuracies in one or more of measurements used to determine the starting state-of-charge value, a calculation used to determine the starting state-of-charge value, and the rechargeable energy storage system being in a non-rested condition when the starting state-of-charge value is determined.

6. The battery system according to claim 1, wherein the battery charger is further configured to receive the plurality of charging tables from a test station configured to calibrate the plurality of charge current limit entries to model recharging of the rechargeable energy storage system.

7. The battery system according to claim 1, wherein the plurality of charge current limit entries in the plurality of charging tables form a three-dimensional surface of entries with a cell potential as a first dimension, a charge rate as a second dimension, and the plurality of initial state-of-charge values as a third dimension.

8. A method for adaptation of charge current limits for a rechargeable energy storage system comprising:
storing in a battery controller a plurality of charging tables that contain a plurality of charge current limit entries of a rechargeable energy storage system, wherein each of the plurality of charging tables corresponds to a unique one of a plurality of initial state-of-charge values of the rechargeable energy storage system, and the rechargeable energy storage system has a rapid charging mode and a discharging mode;
determining a starting state-of-charge value of the rechargeable energy storage system in response to entering the rapid charging mode;
selecting two charging tables from the plurality of charging tables in response to the starting state-of-charge value of the rechargeable energy storage system being adjacent to two of the plurality of initial state-of-charge values; and
controlling a charging current provided to the rechargeable energy storage system based on the plurality of charge current limit entries in the up to two charging tables as selected.

9. The method according to claim 8, wherein a single one of the plurality of charging tables is selected in response to the starting state-of-charge value of the rechargeable energy storage system matching a single value of the plurality of initial state-of-charge values, the method further comprising:
controlling the charging current provided to the rechargeable energy storage system based on the plurality of charge current limit entries in the single one of the plurality of charging tables as selected.

10. The method according to claim 8, further comprising:
generating a plurality of intermediate charge current limit entries by interpolating between the plurality of charge current limit entries in the two charging tables in response to the starting state-of-charge value of the rechargeable energy storage system falling between two of the plurality of initial state-of-charge values, wherein the controlling of the charging current provided to the rechargeable energy storage system is based on the plurality of intermediate charge current limit entries.

11. The method according to claim 8, wherein a first initial state-of-charge value among the plurality of initial state-of-charge values is less than a second initial state-of-charge value among the plurality of initial state-of-charge values, and the plurality of charge current limit entries that correspond to the first initial state-of-charge value cause the rechargeable energy storage system to be charged at a slower rate than the plurality of charge current limit entries that correspond to the second initial state-of-charge value.

12. The method according to claim 8, further comprising:
adjusting the starting state-of-charge value by a margin value prior to the selecting of the two charging tables, wherein the margin value accounts for inaccuracies in one or more of measurements used to determine the starting state-of-charge value, a calculation used to determine the starting state-of-charge value, and the rechargeable energy storage system being in a non-rested condition when the starting state-of-charge value is determined.

13. The method according to claim 8, further comprising:
calibrating the plurality of charge current limit entries to model recharging of the rechargeable energy storage system; and
transferring the plurality of charging tables to the battery controller after the calibration.

14. The method according to claim 8, wherein a slower charging table of the two charging tables is selected in response to the starting state-of-charge value of the rechargeable energy storage system falling between two of the plurality of initial state-of-charge values.

15. A vehicle comprising:
a rechargeable energy storage system having a rapid charging mode and a discharging mode;
a direct-current fast charging connector; and
a battery controller electrically coupled to the rechargeable energy storage system and the direct-current fast charging connector, and configured to:
store a plurality of charging tables that contain a plurality of charge current limit entries of the rechargeable energy storage system, wherein each of the plurality of charging tables corresponds to a unique one of a plurality of initial state-of-charge values of the rechargeable energy storage system;
determine a starting state-of-charge value of the rechargeable energy storage system in response to entering the rapid charging mode;
select two charging tables from the plurality of charging tables in response to the starting state-of-charge value of the rechargeable energy storage system being adjacent to two of the plurality of initial state-of-charge values; and
control a charging current from the direct-current fast charging connector to the rechargeable energy storage system based on the plurality of charge current limit entries in the up to two charging tables as selected.

16. The vehicle according to claim 15, wherein the battery controller is further configured to generate a plurality of intermediate charge current limit entries by interpolating between the plurality of charge current limit entries in the two charging tables in response to the starting state-of-charge value of the rechargeable energy storage system as measured falling between two of the plurality of initial state-of-charge values, wherein the control of the charging current provided to the rechargeable energy storage system is based on the plurality of intermediate charge current limit entries.

17. The vehicle according to claim 15, further comprising a charger configured to adjust the charging current to the rechargeable energy storage system in response to a control signal from the battery controller.

18. The vehicle according to claim 17, further comprising an alternator or a generator, wherein the rechargeable energy storage system has a normal charging mode, and the charger is further configured to route the charging current from the direct-current fast charging connector while in the rapid charging mode, and from the alternator or the generator while in the normal charging mode.

19. The vehicle according to claim 15, wherein the plurality of charge current limit entries in the plurality of charging tables form a three-dimensional surface of entries with a cell potential as a first dimension, a charge rate as a second dimension, and the plurality of initial state-of-charge values as a third dimension.

20. The method according to claim 8, wherein the plurality of charge current limit entries in the plurality of charging tables form a three-dimensional surface of entries with a cell potential as a first dimension, a charge rate as a second dimension, and the plurality of initial state-of-charge values as a third dimension.

\* \* \* \* \*